United States Patent
Dong

(10) Patent No.: US 7,749,627 B2
(45) Date of Patent: Jul. 6, 2010

(54) FUEL CELLS AND METHODS FOR OPERATING SAID FUEL CELLS

(75) Inventor: Junqing Dong, Shenzhen (CN)

(73) Assignee: BYD Company Limited, Shenzhen (CN)

( * ) Notice: Subject to any disclaimer, the term of this patent is extended or adjusted under 35 U.S.C. 154(b) by 1125 days.

(21) Appl. No.: 11/400,690

(22) Filed: Apr. 7, 2006

(65) Prior Publication Data

US 2006/0228612 A1    Oct. 12, 2006

(30) Foreign Application Priority Data

Apr. 11, 2005    (CN) .......................... 2005 1 0020720

(51) Int. Cl.
*H01M 8/04*    (2006.01)
*H01M 8/00*    (2006.01)
(52) U.S. Cl. .......................................... 429/22; 429/13
(58) Field of Classification Search ................... 429/12, 429/13, 17, 34, 38, 22
See application file for complete search history.

(56) References Cited

FOREIGN PATENT DOCUMENTS

CN    1180500    * 12/2004

OTHER PUBLICATIONS

Written Opinion of the International Searching Authority, PCT/CN2006/000643, May 23, 2006, 4pgs.*

* cited by examiner

*Primary Examiner*—Patrick Ryan
*Assistant Examiner*—Thomas H. Parsons
(74) *Attorney, Agent, or Firm*—Venture Pacific Law, PC

(57) ABSTRACT

A fuel cell that uses one or more types of fuel comprises a fuel cell stack, a reservoir connected to the fuel cell stack, and a supply valve that controls the supply of the fuel from its fuel source. Furthermore, methods for operating a fuel cell includes the steps: supplying the fuel to the fuel cell stack and the reservoir from the fuel source, operating the fuel cell from the fuel in the fuel reservoir, supplying said fuel from the fuel source and removing the exhaust from the fuel cell stack into the reservoir. The reservoir stores fuel and exhaust and allows the fuel cell to continue operation for long periods of time without releasing any gaseous exhaust or discharging any liquid exhaust.

7 Claims, 1 Drawing Sheet

FUEL CELLS AND METHODS FOR OPERATING SAID FUEL CELLS

CROSS REFERENCE

This application claims priority from a Chinese patent application entitled "$H_2$—$O_2$ Proton Exchange Membrane Fuel Cells and Methods for Supplying Gases and Draining Water for the Fuel Cells" filed on Apr. 11, 2005 having a Chinese Application No. 200510020720.5. Said application is incorporated herein by reference.

FIELD OF INVENTION

This invention relates to fuel cells and methods for operating fuel cells. In particular, this invention relates to fuel cells and methods for supplying fuel to and releasing exhaust of fuel cells.

BACKGROUND

Fuel cells are power generating devices. Specifically, $H_2$—$O_2$ proton exchange membrane fuel cells are fuels cells that use hydrogen gas and oxygen gas as fuel to generate electrical energy through the reaction of the hydrogen and oxygen. Fuel cells generally comprise of a fuel cell stack, sources for the hydrogen and oxygen, humidifying systems, cooling systems, and control systems. FIG. 1 shows an example of a typical $H_2$—$O_2$ fuel cell using existing technology where (21) is the hydrogen source, (22) is the humidifying system for the hydrogen, (23) is the oxygen source, (24) is the humidifying system for the oxygen, (25) is the hydrogen pressure release valve; (26) is the oxygen pressure release valve, (27) is the hydrogen release valve, (28) is the oxygen release valve, (29) is the circulating pump for hydrogen, (30) is the cooling system, (31) is the external load, and (32) is the fuel cell stack. Many existing fuel cells do not include the circulating pump (29). Two types of cooling system, liquid cooling and air cooling, can be used. Air cooling is primarily used in cells generating less than 1000 watts which produce less heat. A small fan is usually sufficient for air cooling. Cells generating over 1000 watts produce more heat and must be liquid cooled to release the heat. This cooling method is relatively complicated because it requires a variety of equipment such as pumps, heat exchangers, and water processing devices.

The fuel cell stack (32) is the key component in the $H_2$—$O_2$ proton exchange membrane fuel cell. It comprises of one or more membrane electrode assemblies and flow field plates. The membrane electrode assemblies are where fuel reactions occur and it comprises of a proton-exchange membranes, catalyst layers on both sides of the membrane, and gas-diffusion layers. Flow field plates are graphite or metal plates with flow channels on their surfaces. If these channels are blocked, then the fuel or fuels cannot reach the surfaces of the catalyst layers and cell reactions that generate electricity cannot occur.

For $H_2$—$O_2$ fuel cells, the reactions in the fuel cells are:
 a. anode: $H_2 - 2e = 2H^+$
 b. cathode: $\frac{1}{2}O_2 + 2H^+ + 2e = H_2O$
 c. Total reaction: $H_2 + \frac{1}{2}O_2 = H_2O$ The above reaction equations indicate that, for each 1 Ah of electricity, a fuel cell stack with a single cell will generate 0.0187 mol (0.34 g) of exhaust, water, at the cathode. During fuel cell operation, water will gradually accumulate in the flow channels of the flow field plates and block the passage for the fuel to reach the membrane electrodes and react, unless the generated water is discharged from the fuel cell. The water is either vaporized and released with the reacting gases or released in liquid form with the reacting gases.

The theoretical oxygen consumption in $H_2$—$O_2$ fuel cells is 21% of the theoretical air consumption in hydrogen-air fuel cells at the same current. Therefore, under the same power conditions, the amount of exhaust released by $H_2$—$O_2$ fuel cells is far less than that of hydrogen-air fuel cells. Even without humidification, most of the water generated by the $H_2$—$O_2$ fuel cells is generally released in liquid form. The gaseous exhaust of hydrogen-air fuel cells is primarily impurities such as the nitrogen from the air. Pure oxygen gas also contains 0.01~0.05% of impurities. If the exhaust is not released after a few hours of continual operation, the performance of the fuel cell will be compromised when the density of the impurities of the fuel in the channels becomes too high. In addition, releasing the gaseous exhaust also discharges the liquid water that is generated. In order to easily discharge this water with the release of the gaseous exhaust, the fuels, i.e., the fuels that are reacting, must maintain a fairly high flow rate. However, increasing the flow rate will also result in the release of the large volumes of the unreacted fuel thus reducing the efficiency of the cell.

Existing technology generally increases the flow rate of the fuel such as hydrogen or oxygen by improving the design of the flow field plates and reducing the cross sectional area of the flow channels. This will enhance the ability of the exhaust to discharge the water and reduce the quantity of fuel used or consumed. However, since the theoretical quantity of the consumed oxygen is very small, its ability to discharge water is also limited. Even when the design of the flow field plates is optimized, the actual quantity of consumed oxygen for adequate discharge of water needs to be twice the theoretical quantity.

To improve the utilization rate of the fuels, more advanced fuel cell systems recycle the exhaust back into the reacting gas pipeline with pressurized pumps after passing the exhaust through a gas-water separation apparatus. This can reduce the loss of unreacted fuel during the release of exhaust, and lower the use of the fuel. However, this method can also increase the power consumption of the system and limit the total increase in energy efficiency. In addition, this type of design increases the complexity of the system and therefore, also increases the cost for manufacturing such system.

Due to the limitations of the prior art, it is therefore desirable to have novel fuel cells and novel methods for supplying fuels, releasing gaseous exhaust, and discharging liquid such as water in order to manufacture fuel cells that produce low emissions and are highly energy efficient.

SUMMARY OF INVENTION

An object of this invention is to provide cells, particularly $H_2$—$O_2$ fuel cells that have low emissions and are highly energy efficient.

Another object of this invention is to provide highly energy efficient methods for supplying fuels, releasing gaseous exhaust, and discharging liquid exhaust from cells, particularly $H_2$—$O_2$ fuel cells.

The present invention relates to fuel cells that use one or more fuel for fuel cell operation. A preferred embodiment of the present invention comprises of a fuel cell stack, a reservoir for holding a fuel for the fuel cell; and a supply valve that controls the supply of the fuel from its fuel source. The present invention also relates to methods for operating a fuel cell that includes the following steps: supplying a fuel to the fuel cell stack and the reservoir for that fuel from the fuel source, ceasing the supply of the fuel from the fuel source and supplying fuel to the fuel cell stack from the fuel reservoir, supplying said fuel from the fuel source to the fuel cell and fuel reservoir, and, removing the exhaust generated during the operation of the fuel cell from the fuel cell stack into the fuel reservoir.

An advantage of this invention is that the fuel cells, particularly $H_2$—$O_2$ fuel cells, of this invention have low emission and are highly energy efficient.

Another advantage of this invention is that the methods for supplying fuels, releasing gaseous exhaust, and discharging liquid exhaust from cells, particularly $H_2$—$O_2$ fuel cells, are highly energy efficient.

Another advantage of this invention is that the fuel cells of this invention are inexpensive to manufacture.

Another advantage of this invention is that the methods of this invention are easy and inexpensive to implement.

DESCRIPTION OF DRAWINGS

The foregoing and other objects, aspects and advantages of the invention will be better understood from the following detailed description of preferred embodiments of this invention when taken in conjunction with the accompanying drawings in which.

DETAILED DESCRIPTION OF THE PREFERRED EMBODIMENTS

Fuel cells convert chemical energy of their fuels into electrical energy, leaving behind both liquid and gaseous exhaust. $H_2$-air fuel cells use hydrogen and air as the two fuels while $H_2$—$O_2$ proton exchange membrane fuel cell use oxygen and hydrogen as its fuels.

In the present discussion, exhaust includes both gaseous exhaust and liquid exhaust. Therefore, it includes both the gaseous and liquid products produced by the reaction, impurities remaining after the fuel cell reactions, and unreacted fuel. In a $H_2$—$O_2$ fuel cell, the exhaust can include contaminants or impurities in the fuel that remains after the chemical reaction such as the contaminants of oxygen, water vapor and liquid water generated by the reaction, and unreacted fuel.

Generally, fuel cells comprise of a source (fuel supplying source) for each of the fuel that the fuel cell uses, a fuel cell stack where the fuel or fuels react and generate exhaust, an intake for each fuel that the fuel cell uses, humidifying systems, cooling systems for cooling the fuel cell stack, and control systems for controlling the different operating modes of the fuel cell. The sources for the fuels such as hydrogen and oxygen can be connected to a humidifying system. The humidified fuel can then be piped to the intake to the fuel cell stack for that fuel.

The presently preferred embodiments of the fuel cells of the present invention may comprise: a first supply valve to control the flow of a first fuel to a first intake to the fuel cell stack; a first reservoir connected to the fuel cell stack where exhaust and fuel from said fuel cell stack can flow to and from said first reservoir; a first release valve for releasing gaseous exhaust from said first reservoir; and a first discharge valve for discharging liquid exhaust from said first reservoir. Other preferred embodiments embody variations of the above described components for one or more fuels for the fuel cell.

Figure 1:
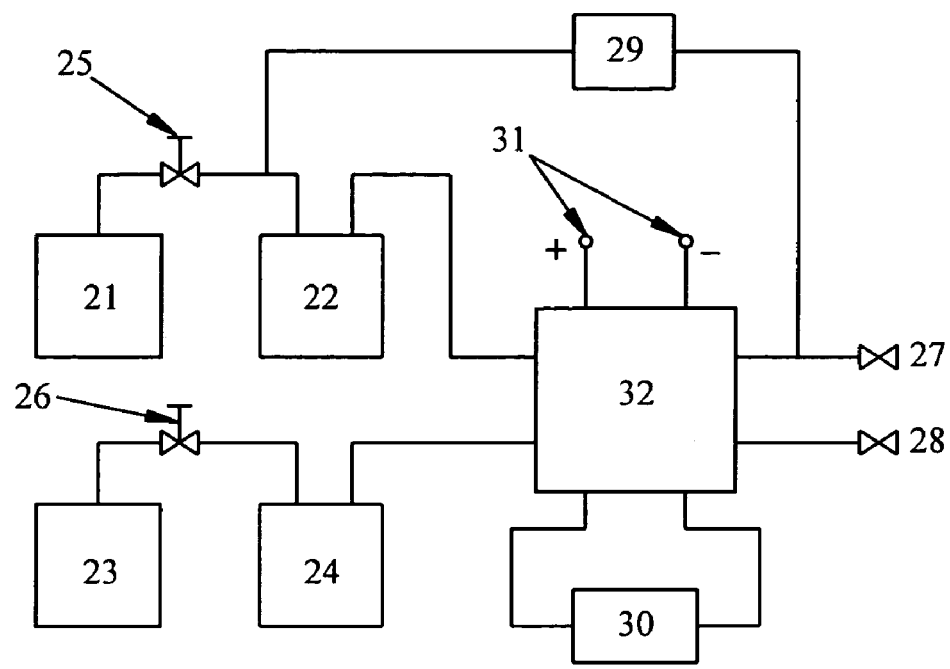
FIG. 1 is an example of a fuel cell using existing technology.
Figure 2:
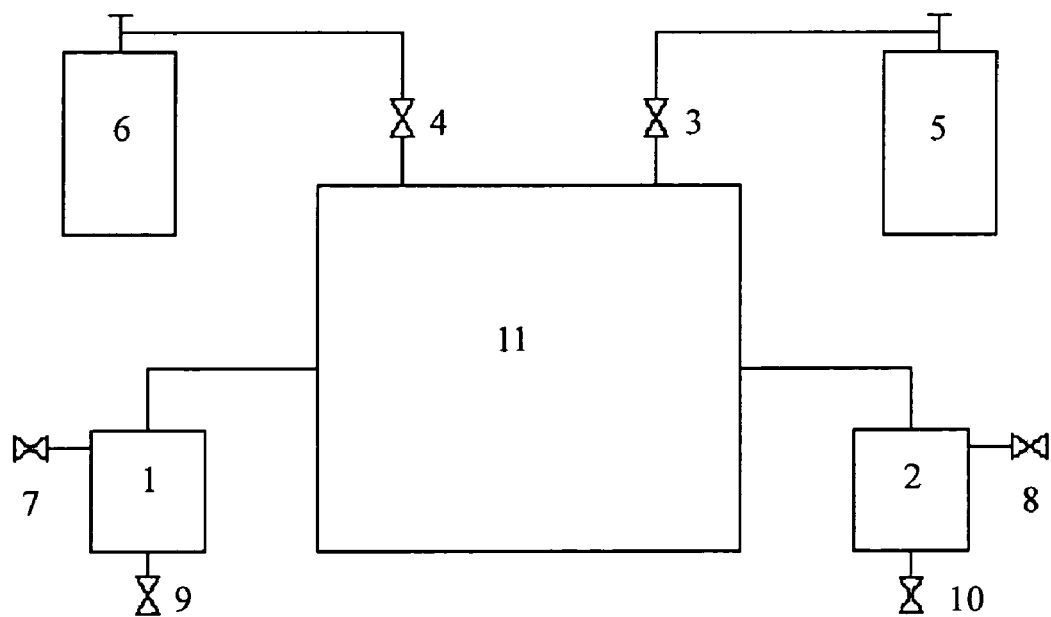
FIG. 2 is a presently preferred embodiment of a fuel cell of this invention where (1) is the reservoir for a fuel such as oxygen; (2) is a reservoir for a second fuel such as hydrogen; (3) is the supply valve for supplying the first fuel; (4) is a supply valve for supplying the second fuel; (5) is the source for the first fuel; (6) is the source for the second fuel; (7) and (8) are release valves to release gaseous exhaust; (9) and (10) are discharge valves for discharging liquid exhaust such as water; and (11) is the fuel cell stack.

FIG. 2 shows a presently preferred embodiment of a fuel cell of the present invention that uses two types of fuel where (1) is a first reservoir for a first fuel such as oxygen that can be connected to the fuel cell stack such that the exhaust from the reaction of the fuels can exit the fuel cell stack and enter the reservoir (1); (2) is a reservoir for a second fuel such as hydrogen that can be connected to the fuel cell stack such that the exhaust from the reaction of the fuels can exit the fuel cell stack and enter the reservoir (2), (3) is a valve (supply valve) for controlling the supply of the first fuel and is placed at the intake pipe for the first fuel; (4) is a valve (supply valve) for controlling the supply of the second fuel and is placed at the intake pipe for the second fuel; (5) is a source (supplying source) for the first fuel; (6) is a source (supplying source) for the second fuel; (7) and (8) are valves (release valves) to release gaseous exhaust and can be placed at the top of the reservoirs; (9) and (10) are valves (discharge valves) for discharging liquid exhaust such as water, usually situated at the bottom of the reservoirs; and (11) is a fuel cell stack.

Preferably, the reservoirs for the fuel are non-corrosive. For example, they can be constructed with non-corrosive metals or other materials or have a non-corrosive lining.

In the preferred embodiments the capacity of the reservoir of a fuel is between 150 times to 1000 times the total volume of the flow channels, i.e., the channels in the fuel cell stack that the unreacted fuel or fuels flow in said fuel cell stack. In another embodiment, the capacity of the reservoir of a fuel can be between 150 times to 1000 times the total volume of the flow channels for a fuel. In preferred embodiments where the fuel cell is a $H_2$—$O_2$ fuel cell where oxygen is the first fuel and hydrogen is the second fuel, the capacity of the reservoir for oxygen or the capacity of the reservoir for the hydrogen is between 150 times and 1000 times of the total volume of the flow channels, including both the flow channels for the hydrogen fuel and the flow channels for the oxygen fuel.

The reservoir for a fuel can hold the fuel, gaseous exhaust and liquid exhaust such as water. When the supply valve for that fuel is closed and the fuel source is not directly supplying that fuel to the fuel cell stack, the fuel cell continues to operate by using the fuel from its reservoir.

In the preferred embodiments, the fuel cell stack is connected to the top part of a reservoir. In the embodiment illustrated by FIG. 2, the fuel cell stack is connected to the upper part of the reservoir (1) for the first fuel and reservoir (2) for the second fuel.

Optimally, the supply valves that control the supply of fuel or fuels to the fuel cell stack can be solenoid valves that are controlled by the control system of the fuel cell.

This invention also provides methods for supplying one or more fuels to a fuel cell, and releasing and discharging the exhaust generated by said fuel cell.

The preferred method, for a fuel cell having a reservoir for one of its fuels, a supply valve to control the supply of this fuel, a release valve for releasing gaseous exhaust from the reservoir, and a discharge valve for discharging liquid exhaust from the reservoir, comprises the following initial step: supplying a fuel to the fuel stack and reservoir for a first operating period.

This initial step can be accomplished by opening the supply valve for the fuel such that the fuel can flow from the supplying source into the fuel cell stack and the reservoir. It is preferred that during this initial step, the release valve for releasing the gaseous exhaust and the discharge valve for discharging the liquid exhaust are also left open for a predetermined period of time to remove any impurities or contaminants in the fuel cell.

After the initial step, the second step is to operate the fuel cell and fuel cell stack by utilizing the fuel in the reservoir during a second operating period. This can be accomplished by closing the supply valve such that the supplying source is not supplying the fuel to the fuel cell stack.

The third step is to again supply fuel to said fuel cell stack and fuel reservoir from said fuel supplying source and removing said exhaust from said fuel cell stack and reservoir for a third operating period.

The above second and third steps are a cycle that is repeated during the continued operation of the fuel cell.

Since the exhaust from the fuel cell operation is removed periodically from the fuel cell stack during the third step, the fuel cell can operate for a long period of time without the need for the release of the gaseous exhaust or the discharge of the liquid exhaust. Periodically, when an excess of exhaust has accumulated in the reservoir and the performance of the fuel cell is lowered to a first determined level, gaseous exhaust can be released from the fuel cell by opening the release valve. Similarly, liquid exhaust can be discharged by opening the discharge valve when the performance of the fuel cell is lowered to a second predetermined level. In another embodiment, in a preferred embodiment with a $H_2$—$O_2$ fuel cell, the liquid exhaust in a reservoir can remain in the reservoir and not be discharged until it has filled half of the volume of the reservoir.

Optimally, when the release valve of a fuel reservoir is opened to release the gaseous exhaust, the supply valve is also opened such that the fuel from the fuel supplying source can enter into the fuel cell stack.

Similarly, for optimal operation, during the discharging period when the discharge valve of a fuel reservoir is opened to discharge the liquid exhaust, the supply valve is also opened.

If the fuel cell uses more than one type of fuel, each having its own reservoir, supply valve, release valve, and discharge valve, then the above described method can be used for each type of the fuel.

In the preferred methods of invention, the supplying source is only directly supplying fuel to the fuel cell stack and to the reservoir when the supply valve is opened in the first and third steps during the first and third operating period. In the second step during the second operating period when the supply valve for the fuel is closed, the fuel in the reservoir is provided to the fuel cell stack for fuel cell operation. During this second operating period, the pressure in the reservoir will decrease as the fuel in the reservoir is being consumed by the fuel cell stack, gaseous exhaust and liquid exhaust from the fuel cell operation such as water will accumulate in the fuel cell stack. Initially, this can occur without significantly affecting the operation of the fuel cell. However, after a certain period of operation (second operating period), the reduced pressure in the fuel reservoir as well as the liquid exhaust that has accumulated in the fuel cell stack will begin to negatively affect fuel cell operation. When that occurs, the supply valve for the fuel can be opened. Once the supply valve is opened, since the pressure in the fuel reservoir is much lower than the pressure of the source of the fuel, the fuel will flow into the reservoir at a relatively high speed or rate of flow, adding fuel to the reservoir. At the same time, while the fuel is entering the reservoir at a relatively high rate of flow, it will also carry the liquid and gaseous exhaust that has accumulated in the fuel cell stack into the reservoirs. Therefore, by repeatedly opening and closing the supply valve, the fuel cell will be supplied with the necessary fuel and the exhaust will also be removed from the fuel cell stack and stored in the reservoir. Since both the liquid and gaseous exhaust generated by the operation of the fuel cell is deposited and stored in the reservoir, the fuel cell can operate for longer periods at optimal conditions without the need for releasing the gaseous exhaust or discharging the liquid exhaust from the fuel cell through the release valve or the discharge valve. In addition, since the reservoir can hold a larger quantity of liquid as well as gaseous exhaust, the release valve for releasing exhaust and the discharge valve for discharging liquid exhaust only need to be opened infrequently. This will significantly prevent the loss of unreacted fuel during the releasing period when gaseous exhaust is released and during the discharging period when the liquid exhaust is discharged. Therefore, the preferred embodiments of this method allow the fuel cell to remain emission free for long periods of time and greatly reduce the consumption of fuel. When the preferred methods are used for $H_2$—$O_2$ fuel cells, the fuel cell can operate with high energy efficiency as almost 100% of the oxygen and hydrogen fuel are used for cell operation and not released unreacted.

To further described this invention, the following embodiment for 1.2 kW $H_2$—$O_2$ fuel cell is examined. This 1.2 kW $H_2$—$O_2$ fuel cell has a fuel cell stack with a rated voltage of 48V, a rated operating electrical current of 25 A, a rated operating temperature of 75° C., and a rated operating pressure for the hydrogen and oxygen of 0.2 MPa.

If this fuel cell does not have features of the preferred embodiments of the present invention, e.g. a reservoir, a supply valve, a release valve, and a discharge valve for at least one of its two fuels, when it is operating under rated conditions, the quantity of hydrogen consumed is 20 slpm, 1.7 times the theoretical quantity of consumption and the quantity of oxygen consumed is 20 slpm, 3.3 times the theoretical quantity of consumption. The hydrogen and oxygen used for fuel operation is 60% and 30% of the hydrogen and oxygen consumed respectively. Therefore, this type of fuel cell has low energy-efficiency In the preferred embodiment, the $H_2$—$O_2$ fuel cell has a structure as shown FIG. 2. The cylindrical hydrogen reservoir (2) has a diameter of 35 cm, a height of 25 cm and a volume of 0.0201 $m^3$. The cylindrical oxygen reservoir (1) has a diameter of 30 cm, a height of 25 cm and a volume of 0.0151 $m^3$. The two reservoirs are installed at the exits for the exhaust of the fuel cell stack. The release valves (7) and (8) are for the release of exhaust or impurities; and the discharge valves (9) and (10) are for the discharge of water in the reservoirs (1) and (2) respectively. All the valves are ball-shaped manual gate valves. The release valves are used to release excessive gaseous exhaust that has accumulated in the reservoirs after a long period of operation while the discharge valves are used to discharge water when water accumulation has become excessive after a long period of operation. Depending on the size of the reservoirs used in the embodiment, exhaust and water can be released once in tens of hours, in a few days, or on as-needed basis. The release and discharge valves can also be manual.

The oxygen and hydrogen reservoirs in this embodiment are made of corrosion-free metal such as stainless steel or regular metal with plastic lining. The capacity of the reservoirs can be between 10 and 10000 times of the total volume of all the flow channels in the fuel cell stack. In the alternative, the capacity of the reservoir for a fuel can be between 10 and 10,000 times the total volume of the flow channels for that fuel. The preferred capacity for a reservoir is primarily determined by the quantity of fuel necessary to allow the fuel cell to operate for between 0.5 minutes and 5 minutes and result in a decrease of pressure in the reservoir to between 50% and 90% of the pressure immediately after the supply valve is closed and the fuel is not being supplied by the fuel supplying source. If a reservoir is too big, when the supply valve for that reservoir is opened, the difference in pressure between the fuel source and the reservoir is small; the rate of flow of the fuel from the supplying source to the reservoir is too low to remove adequate amounts of water from the fuel cell stack. If a reservoir is too small, the pressure difference between the source for the fuel and the reservoir becomes too large and the performance of the fuel cell can fluctuate vastly between the two openings of the supply valve.

The reservoir can be cubical, spherical, cylindrical, or any other shape. However, optimally, the reservoir should be able to withstand a pressure of 0.5 MPa.

The supply valve for the oxygen fuel (3) and the supply valve for the hydrogen fuel (4) are connected to the inputs of the oxygen and hydrogen. They can be positioned at the input pipes for oxygen and hydrogen respectively, preferably near the input of the oxygen and hydrogen fuel into the fuel stack. When the supply valve of a fuel, either hydrogen or oxygen, is opened, the fuel is supplied at a high pressure to the fuel cell stack. If the pressure in the reservoir is low because the fuel in the reservoir has been used for fuel cell operation, when the supply valve for that fuel is opened, the rate of flow of that fuel through the fuel cell into the reservoir will be high. This high rate of flow of the fuel will replenish the depleted fuel in the fuel reservoir and remove the water and gaseous exhaust generated during fuel cell operation in the flow channels of the cell stack into the fuel reservoir.

The supply valves can be regular manual gate valves or solenoid valves. In this preferred embodiment, the supply valves are solenoid valves that are controlled by time relays that can be switched on and off. The second and third operating periods are determined by the reaction times and the capacity of the reservoir and the energy generated by the fuel cell. Preferably, the second operating period, i.e., the period of time that the supply valves are closed can be between 0.5 minutes and 10 minutes and the third operating period can be between 1 second and 30 seconds. After experimentation, the preferred capacity of the oxygen reservoir and the hydrogen reservoir is determined to be between 150 times and 1000 times of the total volume of the of the flow channels. The optimal period between two successive openings of the supply valve is between 0.5 minutes and 2 minutes, and the optimal third operating period is between for 4 seconds and 15 seconds. If the period between two successive openings of a supply valve lasts more than 2 minutes, the water generated by the fuel cell operation will gradually flood the flow channels in fuel cell, causing the performance of the fuel cell to deteriorate. If the period between two successive openings of a supply valve is too short, the pressure difference between the in-coming fuel from the fuel supplying source and the pressure in the fuel reservoir is small such that the resulting rate of flow for the fuel is too low and insufficient to adequately remove the water accumulated in the fuel cell stack.

The optimal third operating period is between 4 seconds and 15 seconds. If the third operating period is too short, insufficient fuel is supplied to replenish the fuel that has been used for fuel cell operation in the reservoir. If the third operating period is too long, e.g., if the operating period is between 7 seconds and 8 seconds, the pressure difference between the incoming fuel and the reservoir would be decreased resulting in too low of a flow rate to effectively remove water from the fuel cell stack to the reservoir.

During fuel cell operation, a preferred method of operation comprises of opening the hydrogen supply valve every 60 seconds for 6 seconds; and opening the oxygen supply valve every 90 seconds for 6 seconds. Within 6 seconds after the solenoid supply valve for the hydrogen fuel is opened, the average rate of flow of hydrogen gas is 120 slpm. This flow rate is 6 times the rate of flow of hydrogen in prior art $H_2$—$O_2$ fuel cells. Within 6 seconds after the solenoid supply valve for the oxygen fuel is opened, the average rate of flow of the oxygen is 90 slpm for the oxygen gas. This flow rate is 4.5 times the rate of flow in prior art $H_2$—$O_2$ fuel cells. With these high flow rates, the ability to remove water from the fuel cell stack to the reservoir is improved significantly.

To start the operation of the fuel cell, the preferred method for operating the fuel cell includes the following steps:

opening an oxygen supply valve (3), a hydrogen supply valve (4), release valve (7) and discharge valve (8) to clear any impurity or exhaust from hydrogen reservoir (2) and the oxygen reservoir (1); and closing the release valve and discharge valve (7) and (8) and filling the oxygen reservoir and hydrogen reservoir with the respective fuel.

After the fuel cell has started operation with this first supply of fuel, the following method is repeated during the continual operation of the fuel cell:

closing the oxygen supply valve (3) and stopping the direct supply of oxygen from the oxygen supplying source when the pressure in the oxygen reservoir (1) approaches the pressure of the incoming gas from the oxygen supplying source such that the oxygen flows from its reservoir flows into the fuel cell stack for fuel cell operation;

closing the hydrogen supply valve (4) and stopping the direct supply of hydrogen from the hydrogen supplying source when the pressure in the hydrogen reservoir (2) approaches the pressure of the incoming gas from the hydrogen supplying source such that the hydrogen flows from its reservoir flows into the fuel cell stack for fuel cell operation;

opening the oxygen supply valve when the performance of the fuel cell is affected due to the decreasing pressure in the oxygen reservoir, or due to the water accumulation in the fuel stack; and opening the hydrogen supply valve when the performance of the fuel cell is affected due to the decreasing pressure in the hydrogen reservoir or the water accumulation in the fuel stack.

Each of the above steps can be repeated continuously during fuel cell operation when the conditions stated in the steps occur.

After the closing of a supply valve, the fuel cell operates solely on the fuel supplied by the reservoir of the fuel supply valve. During this part of the fuel cell operation, the pressure in reservoir for that fuel with the closed supply valve will decrease somewhat. In addition, water from the reaction of the fuels will accumulate in the fuel cell stack. Initially, this decrease in pressure and water accumulation will not significantly affect the performance of the cell. However, as the fuel cell continues its operation, the fuel in the reservoir, without the supply from the supplying source, will gradually be depleted. The pressure in that reservoir would be lowered. In addition, water will accumulate in the fuel cell stack. When the performance of the fuel cell is affected by the lowered pressure or the water accumulation, the supply valve for that fuel can be opened to replenish the reservoir.

When the supply valve for that fuel is once again opened, since the pressure in the reservoir has decreased significantly when compared with the pressure of the incoming fuel from the fuel supplying source, fuel will enter the hydrogen and oxygen reservoirs at a high instantaneous rate of flow, replenishing the diminished quantity of fuel in the reservoir. In addition, the fuel rushing into the reservoir at high speed will also bring with it the accumulated water from the fuel cell stack.

The above steps describe the fuel cell operating in a manner where no unreacted fuel is emitted from the fuel cell after the initial start-up phase when the release valves are opened to release contaminants. Thus the fuel cell is emission free during repeated steps involved in the continual operation of the fuel cell. This can occur for a relatively long period of time as the exhaust can remain unreleased and water can remain in the reservoir for a long period of time without affecting the performance of the fuel cell. Without the loss of the hydrogen and oxygen fuel during the release of the exhaust or the discharge of water, nearly 100% of the hydrogen and oxygen gas are used for fuel cell operation thus achieving high energy efficiency for the fuel cell.

When water, in a reservoir becomes excessive, it can be discharged from the reservoir by opening the discharge valve for that reservoir. For this step of the operation, it is preferable for the release valve be closed and the supply valve for the fuel in that reservoir be opened.

When the gaseous exhaust in a reservoir becomes excessive, it can be released by opening the release valve for the reservoir. For optimal performance, the supply valve for the fuel in the fuel reservoir should also be opened. If the supply valve is not opened when the release valve is opened, the fuel cell performance can be compromised as there will be an insufficient supply of fuel for the fuel cell reaction.

Although some unreacted fuel may escape with the exhaust when the gaseous exhaust is released or the liquid exhaust is discharged, the quantity of lost fuel is insignificant when compared with the quantity of fuel used for fuel cell reactions since the release of the exhaust or discharge of water from the fuel reservoir is rarely needed.

Using the preferred methods of operation for the fuel cell of this invention, except for releasing impurities or gaseous exhaust every few hours or the discharging of the liquid exhaust when an excessive amount of water accumulates in the reservoirs, the fuel cell stack of a fuel cell can operate continuously for hours without any emission. The hydrogen gas and oxygen gas supplied can be almost totally utilized for fuel cell operation without any loss and the usage rate for fuel cell operation is almost 100%. Therefore, using the preferred embodiments of this invention or methods for operating the fuel cell of this invention, the energy efficiency of the fuel cell operation is greatly improved.

While the present invention has been described with reference to certain preferred embodiments, it is to be understood that the present invention is not limited to such specific embodiments. Rather, it is the inventor's contention that the invention be understood and construed in its broadest meaning as reflected by the following claims. Thus, these claims are to be understood as incorporating not only the preferred embodiments described herein but all those other and further alterations and modifications as would be apparent to those of ordinary skilled in the art.

I claim:

1. A method for operating a fuel cell utilizing at least one fuel and generating liquid exhaust and gaseous exhaust in the process, wherein said fuel cell having a fuel supplying source, a fuel cell stack, a supply valve, and a reservoir, wherein a flow rate of the fuel to the fuel cell stack is controlled by the supply valve, wherein the reservoir stores the gaseous exhaust and the liquid exhaust as a function of the flow rate, and wherein the reservoir provides the fuel to the fuel cell stack as a function of the flow rate, comprising the steps of:

supplying said fuel to said fuel cell stack and said reservoir from said fuel supplying source for a first operating period;

operating said fuel cell with fuel from said reservoir for a second operating period; and supplying said fuel to said fuel cell stack and said reservoir from said fuel supplying source and removing liquid and gaseous exhaust from said fuel cell for a third operating period.

2. The method of claim 1 wherein said fuel cell stack having flow channels and the capacity of said reservoir is between 150 times and 1000 times the volume of the flow channels.

3. The method of claim 2 also comprising the steps of releasing said gaseous exhaust from said reservoir when the performance of said fuel cell reaches a first predetermined level and discharging said liquid exhaust from said reservoir when the performance of said fuel cell reaches a second predetermined level.

4. The method of claim 1 further comprising the step of releasing said gaseous exhaust from said reservoir when the performance of said fuel cell reaches a first predetermined level.

5. The method of claim 1 further comprising the step of discharging said liquid exhaust from said reservoir when the performance of said fuel cell reaches a second predetermined level.

6. The method of claim 1 wherein said fuel comprises a first fuel and a second fuel.

7. The method of claim 6 wherein said first fuel is hydrogen and said second fuel is oxygen.

* * * * *